(12) United States Patent
Jang

(10) Patent No.: US 7,997,615 B2
(45) Date of Patent: Aug. 16, 2011

(54) OCCUPANT RESTRAINT SYSTEM

(75) Inventor: Jinsoo Jang, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/441,855

(22) PCT Filed: Oct. 10, 2007

(86) PCT No.: PCT/JP2007/069777
§ 371 (c)(1),
(2), (4) Date: Feb. 2, 2010

(87) PCT Pub. No.: WO2008/047652
PCT Pub. Date: Apr. 24, 2008

(65) Prior Publication Data
US 2010/0140909 A1    Jun. 10, 2010

(30) Foreign Application Priority Data

Oct. 19, 2006 (JP) ................. 2006-284607

(51) Int. Cl.
*B60R 21/16* (2006.01)
(52) U.S. Cl. ............... 280/743.1; 280/743.2; 280/730.1
(58) Field of Classification Search ............ 280/730.1, 280/730.2, 743.1, 743.2
See application file for complete search history.

(56) References Cited

U.S. PATENT DOCUMENTS

| | | | |
|---|---|---|---|
| 5,222,761 A | 6/1993 | Kaji et al. | |
| 6,394,487 B1 | 5/2002 | Heudorfer et al. | |
| 6,588,793 B2 | 7/2003 | Rose | |
| 6,913,280 B2 | 7/2005 | Dominissini et al. | |
| 7,290,798 B2 * | 11/2007 | Mori et al. .............. | 280/743.1 |
| 7,350,804 B2 * | 4/2008 | Bakhsh et al. .......... | 280/730.2 |
| 7,364,185 B2 * | 4/2008 | Mori et al. .............. | 280/730.1 |
| 7,581,750 B2 | 9/2009 | Hirata et al. | |
| 7,762,579 B2 * | 7/2010 | Garner ..................... | 280/730.2 |
| 7,806,432 B2 * | 10/2010 | Nelson et al. ............ | 280/730.2 |
| 2002/0175504 A1 * | 11/2002 | Tanase et al. ............ | 280/730.2 |
| 2004/0239083 A1 * | 12/2004 | Mori et al. ............... | 280/730.1 |
| 2006/0055153 A1 * | 3/2006 | Hirata ...................... | 280/728.1 |
| 2006/0097491 A1 * | 5/2006 | Saberan et al. .......... | 280/730.1 |
| 2006/0214401 A1 * | 9/2006 | Hirata ...................... | 280/730.1 |

FOREIGN PATENT DOCUMENTS

| | | |
|---|---|---|
| EP | 1 676 758 A1 | 7/2006 |
| JP | S47-24575 B1 | 7/1972 |
| JP | S64-7053 U | 1/1989 |
| JP | H03-121156 U | 12/1991 |
| JP | H04-135942 A | 5/1992 |
| JP | H04-135945 A | 5/1992 |
| JP | H07-186870 | 7/1995 |
| JP | 2001-171471 A | 6/2001 |
| JP | 2005-001412 A | 1/2005 |
| JP | 2005-335694 A | 12/2005 |

* cited by examiner

*Primary Examiner* — Toan C To
(74) *Attorney, Agent, or Firm* — Fitch Even Tabin & Flannery

(57) ABSTRACT

An occupant restraint system according to one form of the present invention includes a side airbag device having a first airbag for, in a side collision, receiving gas supply from an inflator and inflating to deploy such that the first airbag covers a side internal surface of a passenger compartment, and a rear seat airbag device having a second airbag that is housed in a support section formed in a rear tray, the support section being covered with a lid, and, in a side collision, receives gas supply from the inflator, presses to open the lid, projects out of the support section, and inflates to deploy toward seating surfaces of rear seats.

13 Claims, 10 Drawing Sheets

OCCUPANT RESTRAINT SYSTEM

CROSS-REFERENCE TO RELATED APPLICATIONS

This application is a U.S. national phase application filed under 35 U.S.C. §371 of International Application PCT/JP2007/069777, filed on Oct. 10, 2007, designating the United States, which claims priority from Japanese Application 2006-284607, filed Oct. 19, 2006, which are hereby incorporated herein by reference in their entirety.

TECHNICAL FIELD

The present invention relates to an occupant restraint system provided with an airbag for restraining an occupant in the event of a side collision or a rollover of a vehicle.

BACKGROUND ART

An airbag device that inflates to deploy an airbag between occupants seated on the rear seats of a vehicle for protecting the occupants from colliding with each other is proposed in Japanese Unexamined Utility Model Registration Application Publication No. Hei 3-121156. The airbag device disclosed in Japanese Unexamined Utility Model Registration Application Publication No. Hei 3-121156 is provided with a side airbag for inflating to deploy between the door and the occupant in a side collision and with an airbag for restraining the rear seat occupant by deploying in the middle between the rear seats in a side collision.

An airbag device disclosed in Japanese Unexamined Utility Model Registration Application Publication No. Hei 3-121156 is housed in a movable armrest storable in a rear seat back. Therefore, the airbag device basically operates when the armrest is kept horizontal. However, unless the airbag device is designed to operate when the armrest is in a stored state, a function of the airbag device as an occupant restraint system is significantly depreciated. Accordingly, the airbag system disclosed in Japanese Unexamined Utility Model Registration Application Publication No. Hei 3-121156 includes two airbags and a set of airbags which are switched to operate depending on whether or not the armrest is stored in the seat back.

However, the airbag device causes such problems as complicated gas line as well as necessity for two airbags.

SUMMARY OF THE INVENTION

An object of the present invention is to provide an occupant restraint system including a rear seat airbag device having a simple structure and restraining a rear seat occupant.

A further object of the present invention is to provide an occupant restraint system including a rear seat airbag device having a simpler structure for effectively restraining the rear seat occupant in association with a side airbag system in the event of a side collision.

To achieve the above object, the present invention is characterized by a side airbag device having a first airbag for, in a side collision, receiving gas supply from an inflator and inflating to deploy such that the first airbag covers a side internal surface of a passenger compartment, and a rear seat airbag device having a second airbag that is housed in a support section formed in a rear tray, the support section being covered with a lid, and, in a side collision, receives gas supply from the inflator, presses to open the lid, projects out of the support section, and inflates to deploy toward seating surfaces of rear seats. With the system, a rear seat occupant may be restrained in various types of collision pattern by each of airbag devices having a simple structure.

The support section may be constructed with a first recessed portion formed in a rear tray. Also, the support section is preferably formed in the rear tray in such a manner that the second airbag inflates to deploy in a breadthwise direction of a vehicle so as to be able to restrain a rear seat occupant from an internal side of the vehicle. This causes the rear seat occupant to be restrained from both sides with the side airbag device and the rear seat airbag device.

The second airbag is designed to have height above seating surfaces of the rear seats so that a head of the rear seat occupant may be restrained at the time of inflation and deployment thereof, thereby enhancing occupant restraint performance in cooperation with the side airbag device in a collision.

The second airbag may include an external airbag that is formed in a L-shape at the time of the inflation and deployment thereof and has an opening through which the gas is discharged by pressing force exerted by the rear seat occupants after the inflation and deployment, and an air tight internal cylindrical airbag being formed in an L-shape inside the external airbag at the time of the inflation and deployment thereof. With the system, energy of collision is effectively absorbed by deformation of the external airbag while the rear seat occupant is restrained. When the occupant needs to be further restrained in the event of a rollover or the like, the rear seat occupant is restrained by an internal cylindrical airbag that retains an inflated state.

The second airbag may include a first and second bags that are formed in an L-shape having a second recessed portion formed at each side thereof being in contact with the rear seat occupant at the time of inflation and deployment thereof, and are joined to each other so as to be symmetrical relative to the joining surface. This system allows the second recessed portion and a portion filled with the gas to contact with a region from a shoulder to a side of the thorax of the rear seat occupant and a head and a lumbar area of the rear seat occupant, respectively, thereby softly restraining the rear seat occupant.

The first and second airbags may be joined to each other by being bundled with a belt-like member. Accordingly, the first and second airbags may be easily integrated into one unit.

The second airbag may include two first chambers each having an L-shaped form at the time of inflation and deployment thereof and an opening through which the gas is discharged by pressing force exerted by the rear seat occupants at the time of restraint, and an air tight second chamber disposed between the two first chambers.

Preferably the side airbag device includes the first airbag folded and housed in an upper side portion of a passenger compartment so as to deploy in a curtain-like form along an inner side of the passenger compartment. With this system, a housing space for the airbag device covering a wide area may be effectively achieved.

Preferably the side airbag device includes the first airbag folded and housed in a substantially square U-shaped third recessed portion formed flat in a part of a ceiling liner member directing toward and opened to a rear side of the vehicle so as to deploy such that a wall-like unit combining a front wall and both of side walls surrounds the rear seats. With this system, restraint performance for various types of collision pattern may be enhanced.

Preferably the rear seat airbag device includes the second airbag folded and housed in a casing together with the inflator. Preferably the casing has an upper opening covered with the lid and secured to the support section. With this system, a rear tray may be used as an effective housing space for the rear seat airbag.

Advantages

According to the present invention, rear seat occupants may be effectively restrained by a side airbag and a rear seat airbag that is inflated to deploy between the rear seat occupants.

DETAILED DESCRIPTION OF THE PREFERRED EMBODIMENTS

An occupant restraint system according to the present invention will now be described below in terms of best modes for carrying out the invention with reference to the accompanying drawings.

Embodiment 1

Occupant restraint system consisting of a side curtain airbag device and a rear-seat center airbag device.

Figure 1:
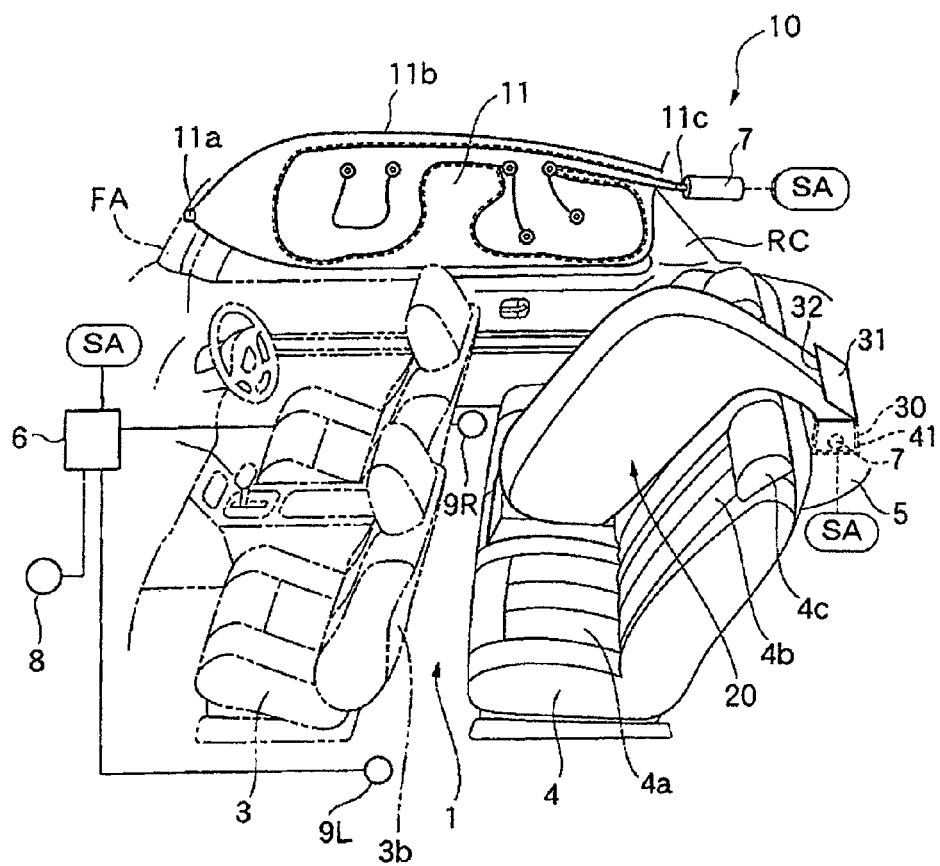
FIG. 1 is a diagram depicting airbags (side curtain airbag device and rear center airbag device) in an inflated state, according to one embodiment of the occupant restraint system of the present invention.

As shown in FIG. 1, an occupant restraint system 10 in Embodiment 1 includes a side curtain airbag device (hereinafter referred to as curtain airbag) 11 and a rear-seat center airbag device (hereinafter referred to as center airbag) 20.

The curtain airbag 11 is an airbag that inflates to deploy between the door and the occupant of a vehicle in the event of a side collision of the vehicle, and is housed in the upper side portion of the vehicle. The curtain airbag 11 has a size to allow the front and rear seats of the vehicle to be covered thereby. The curtain airbag 11 is secured at the leading edge 11a and the upper side 11b thereof to the vehicle. The leading edge 11a of the curtain airbag 11 is bolted to a body anchor at the front pillar FA via a plurality of mounting tabs formed at the upper end edge along the lengthwise direction of the vehicle. The upper side 11b of the curtain airbag 11 is secured to an anchor portion formed on a roof side rail extending in the longitudinal direction of the vehicle. The roof side rail extends from the upper end of the front pillar FA to the upper end of the rear pillar RC. The curtain airbag 11 in a folded state is covered by a lid extending in the lengthwise direction. This lid covers the roof side rail and serves as a partitioning molding provided between the ceiling and the side of the vehicle for the purpose of the vehicle design.

The curtain airbag 11 is provided at the rear end thereof with a gas inlet 11c. The gas inlet 11c is connected to an inflator 7.

The inflator 7 includes an agent thereinside, and ignites the agent if an onboard acceleration sensor detects acceleration exceeding a threshold in the event of a side collision or the like of the vehicle. The inflator 7 supplies a gas produced by the combustion (explosion) of the agent to the curtain airbag 11 through the gas inlet 11c for inflating the curtain airbag 11. The inflating curtain airbag opens up the lid that covers the roof side rail, and downwardly deploys in the shape of a curtain in such a manner that the area from the upper edge of the vehicle side to the front seat to the rear seat is covered.

Meanwhile, the center airbag 20 is normally housed in a resin casing 30 in a folded state. Furthermore, the center airbag 20 is fit in and secured to a support section that consists of a recessed portion (concave portion) 41 formed at the rear of a rear seat back 4b in the breadthwise center of a rear tray 5.

Like the above-mentioned curtain airbag 11, the center airbag 20 receives gas supply from the inflator 7 in the event of a collision. The inflator 7 for the curtain airbag 11 may be constructed with the same components as the inflator 7 for the center airbag 20, or with the different components from the inflator 7 for the center airbag 20.

As shown in FIG. 1, when receiving gas supply from the inflator 7 the center airbag 20 presses to open a score groove 32 in the lid 31 and deploys in a wall-like form at the middle of the left-hand and right-hand rear seats in such a manner that the center airbag 20 extends from the rear seat back 4b to the seating surface 4a. In other words, the center airbag 20 inflates to deploy in a wall-like form in such a manner that the airbag restrains an occupant seated on the rear seats by extending from the opposite side of the rear window (from the inboard side of the axle). In this embodiment, when three or more occupants are seated on the rear seats, the center airbag 20 is controlled so as not to inflate even if a collision is detected. To do so, a device, such as a seat weight sensor or the like, to detect the seating status of an occupant is provided in the rear center seating position.

A typical structure of the center airbag 20 is described with reference to FIGS. 2 to 5.

EXAMPLE 1

Center Airbag in a Wall-Like Form

Figure 2:
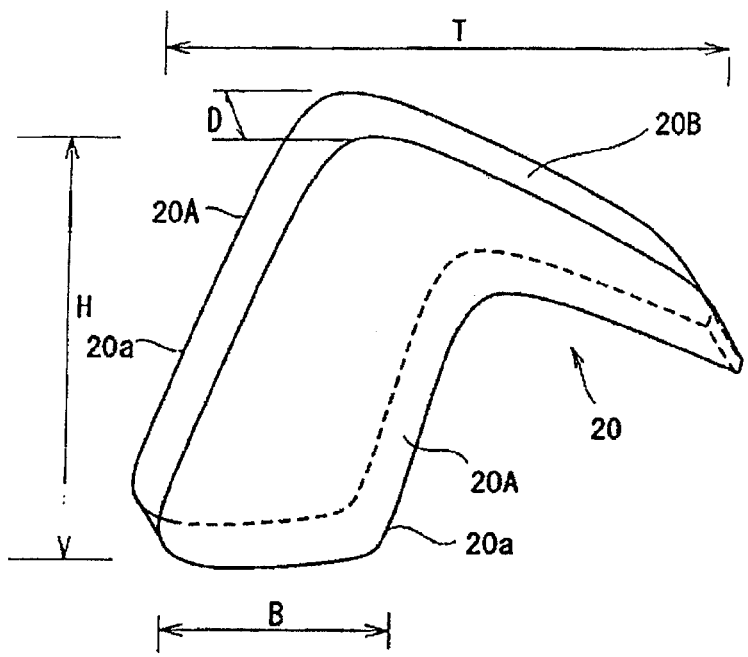
FIG. 2 is a perspective view of an exemplary structure according to one embodiment of the rear center airbag device shown in FIG. 1.

FIG. 2 is a schematic diagram of a center airbag 20 according to Example 1 in an inflated state. The center airbag 20 includes two side panels 20A having a substantial L shape, when viewed from the side thereof, which consist of foundation cloths having the same shape. In the center airbag 20, the circumferences of the two side panels are sewed into a belt-like panel 20B of the same material as the side panels in such a manner that the center airbag has a wall-like form when inflated. When inflated, the center airbag roughly measures 300 to 400 mm in width B of the bottom face-to-face with the seating face by 750 to 800 mm in overall height H by 700 to 800 mm in upper width T by 170 to 200 mm in thickness D. The overall height H is equivalent to a height above the seating face. As shown above, the center airbag is high enough to allow occupant heads to be restrained.

A seam 20a in the foundation cloth is provided with a sealing tape along the entirety thereof to keep the center airbag air-tight. The seam 20a may be coated with an adhesive for this purpose.

EXAMPLE 2

Dual Structure Center Airbag

Figure 3:
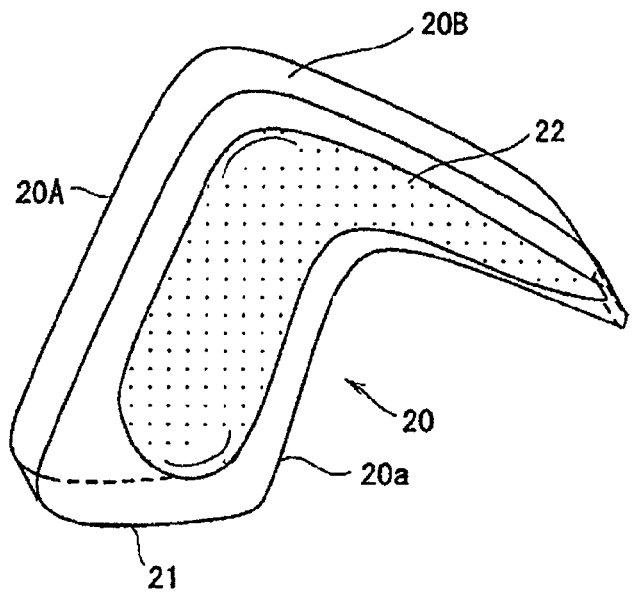
FIG. 3 is a perspective view of an exemplary structure according to another embodiment of the rear center airbag device.
Figure 4A:
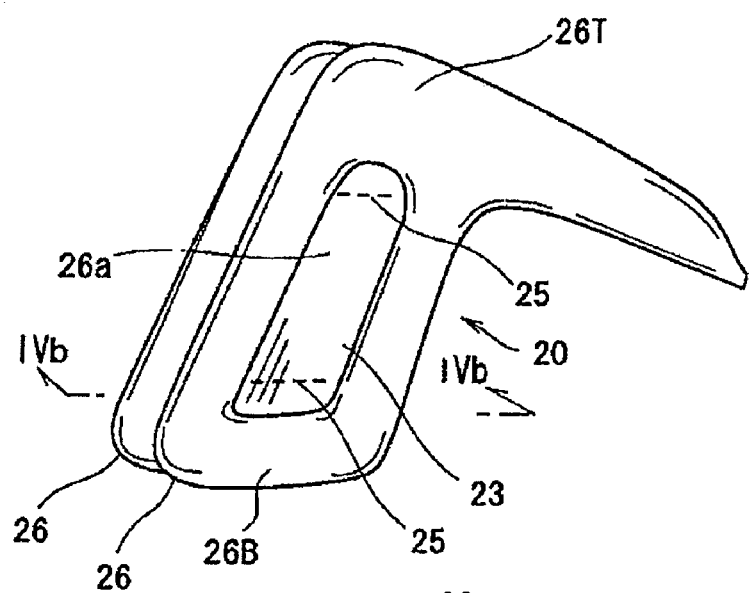
FIGS. 4(a) and 4(b) are a perspective view and a cross-sectional view, respectively, of an exemplary structure according to another embodiment of the rear center airbag device.
Figure 4B:
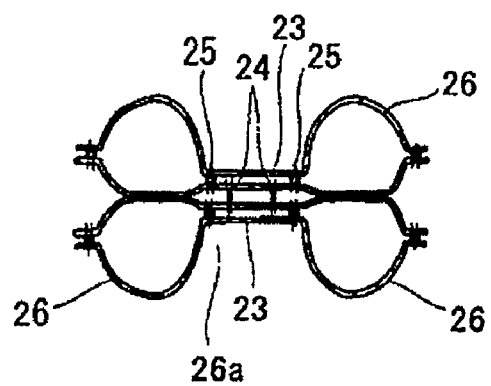
Figure 5A:
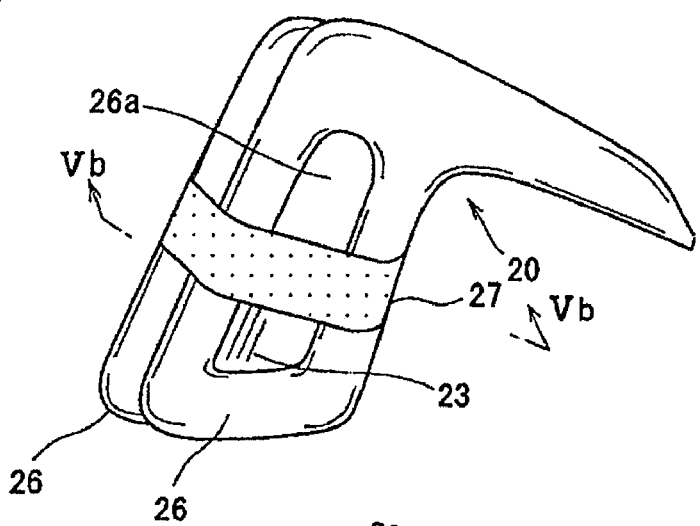
FIGS. 5(a) and 5(b) are a perspective view and a cross-sectional view, respectively, of an exemplary structure according to another embodiment of the rear center airbag device.
Figure 5B:
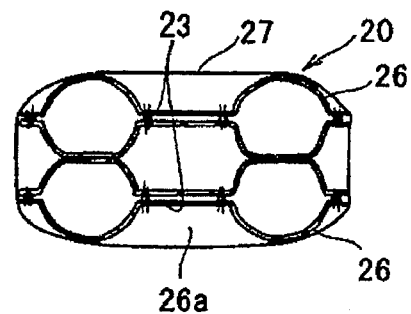

FIG. 3 is a schematic diagram of a center airbag 20 according to Example 2 in an inflated state. The center airbag 20 has a dual structure consisting of an external airbag 21 and an internal-cylindrical airbag 22 that is housed in the external airbag 21 and inflates at the same time as the external airbag 21.

The external airbag 21 has the same shape and dimensions as, for example, the airbag according to Example 1. The internal-cylindrical airbag 22 is a substantially cylindrically shaped airbag having a diameter of approximately 150 mm, which has a substantially L-shaped side, when viewed from the side, similar to that of the external airbag 21.

A seam for allowing the internal cylindrical airbag 22 to have a cylindrical shape is provided with a sealing tape (not illustrated) to keep the airbag air-tight.

In contrast, no sealing tape is attached to the seam of the external airbag 21. For this reason, when an occupant is restrained by the inflated external airbag 21 in the event of a collision, the gas in the external airbag 21 leaks through the seam by the pressure exerted by the occupant. As a result, the external airbag 21 deforms while restraining the occupant. By deforming while restraining the occupant, the external airbag 21 absorbs energy resulting from the collision. If the occupant needs to be further restrained in the event of a rollover or the like, the occupant is restrained by the internal cylindrical airbag 22 inside the deflating external airbag 21 since the internal cylindrical airbag 22 retains its inflated state inside the external airbag 21. The internal cylindrical airbag 22 may be constructed with either an ordinary foundation cloth or a coated foundation cloth.

EXAMPLE 3

Center Airbag Having a Thorax Restraint Region Formed Therein

FIGS. 4(*a*) and (*b*) show a center airbag 20 according to Example 3. The center airbag 20 has a thorax restraint region 23 formed in the side wall thereof. The center airbag 20 is formed by sewing together the thorax restraint regions 23 of the two airbags 26 having the same shape in such a manner that concave portions 26a are formed in the middle of the airbags 26. The thorax restraint regions 23 are panel-like portions located in the concave portions 26a.

Each of the thorax restraint regions 23 is surrounded by the circular circumference of the airbag, and, as shown in FIG. 4(*b*), is formed as a thin panel by joining with an adhesive 25 and sewing together portions of the two foundation cloths. The two airbags 26 can be integrated into one unit by sewing together portions 24 of the foundation cloths in advance, corresponding to the thorax restraint regions 23 of the two airbags 26 having the same shape. As shown in FIG. 4(*b*), this provides shapes that are symmetrical in relation to the joining face between the two airbags 26, thereby allowing both of the occupants seated on the seats to be restrained in an equal manner. When restrained, the occupants contact with the thorax restraint region 23 at the shoulder to the side of the thorax thereof, thereby allowing the occupants to be mildly restrained by the greatly deformable regions of the airbag. In contrast, the occupants' head and lumbar come into contact with and are restrained by an upper airbag 26T and a lower airbag 26B that do not tend to deform due to the gas filled in the airbag.

EXAMPLE 4

Example of a Modified Center Airbag Having a Thorax Restraint Region Formed Therein FIG. 5(*a*) shows an example of a modified center airbag 20 having a thorax restraint region formed therein. Unlike Example 3, this airbag 20 is formed by sewing the thorax restraint regions of the two airbags 26 into each other and then sewing a belt-like foundation cloth 27, as shown in FIG. 5(*a*), into these airbags 26 to form one bundle of airbags. According to this method, two airbags 26 can be easily integrated into one unit having two thorax restraint regions 23 formed therein. This center airbag 20 also can softly restrain occupants at their shoulder to the side of their thorax by means of the belt-like foundation cloth 27 and the thorax restraint region formed in each of the airbags 26.

Figure 6A:
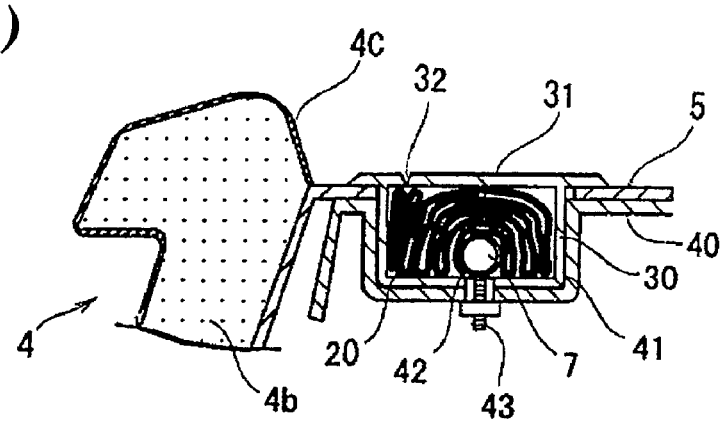
FIGS. 6(a) and 6(b) are partial cross-sectional views depicting the rear center airbag device as housed in the tray and that as it begins to inflate.
Figure 6B:
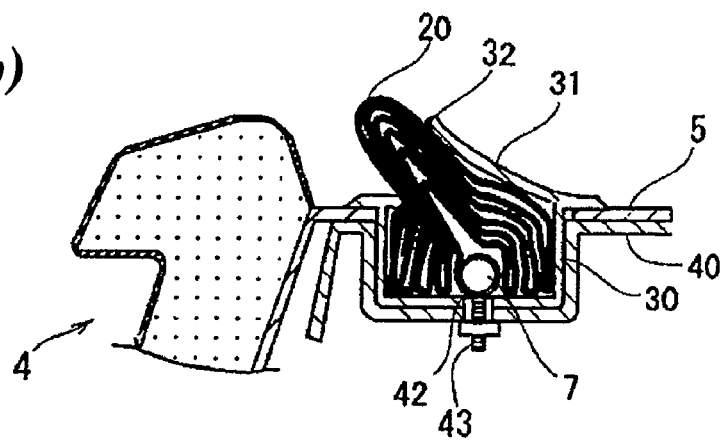

FIGS. 6(*a*) and 6(*b*) show a center airbag 20 as housed in part of a rear tray 5 and a center airbag 20 as it begins to inflate.

As shown in FIG. 6(*a*), the center airbag 20 is normally housed in a resin casing 30 in a folded state, together with an inflator 7. The resin casing 30 is covered at the top face thereof with a lid 30 made of the same material as the rear tray 5. The lid 31 has a V shaped, thin-wall score groove 32 formed at part thereof so as to run across the lid 31. The resin casing 30 is housed in a recessed portion 41 formed in the structure 40 of a vehicle body which supports the rear tray 5 located behind a rear seat headrest 4c. Also, the resin casing 30 is secured to the structure 40 using a mounting member 43 such as a bolt, together with a retainer 42 that retains the inflator 7.

With this arrangement, when the command for triggering the inflator 7 is issued in a collision or the like, the inflator 7 generates and supplies a gas to the center airbag 20, which then begins to inflate. The inflating airbag exerts pressing force on the lid 31 of the resin casing 30. As shown in FIG. 6(*b*), the pressing force tears the score groove 32, causing the lid 31 to be opened upward. Then, as shown in FIG. 6(*b*) and FIG. 1, the center airbag 20 inflates to deploy so as to extend from the rear tray 5 to the rear seat back 4b and to the seating face 4a.

Embodiment 2

Occupant restraint system consisting of a rear seat surrounding airbag device and a center airbag device.

Figure 7:
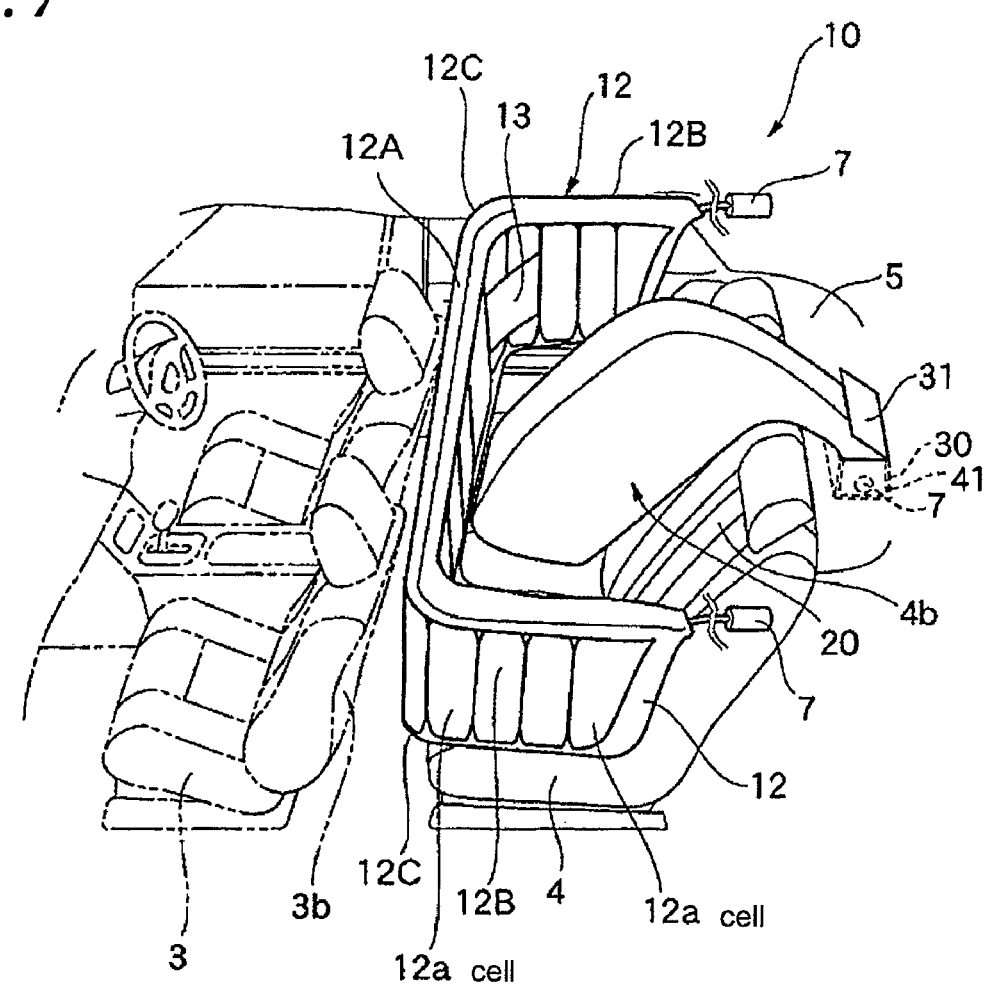
FIG. 7 is a diagram depicting airbags (rear seat surrounding airbag device and rear seat center airbag device) in an inflated state, according to another embodiment of the occupant restraint device.
Figure 8:
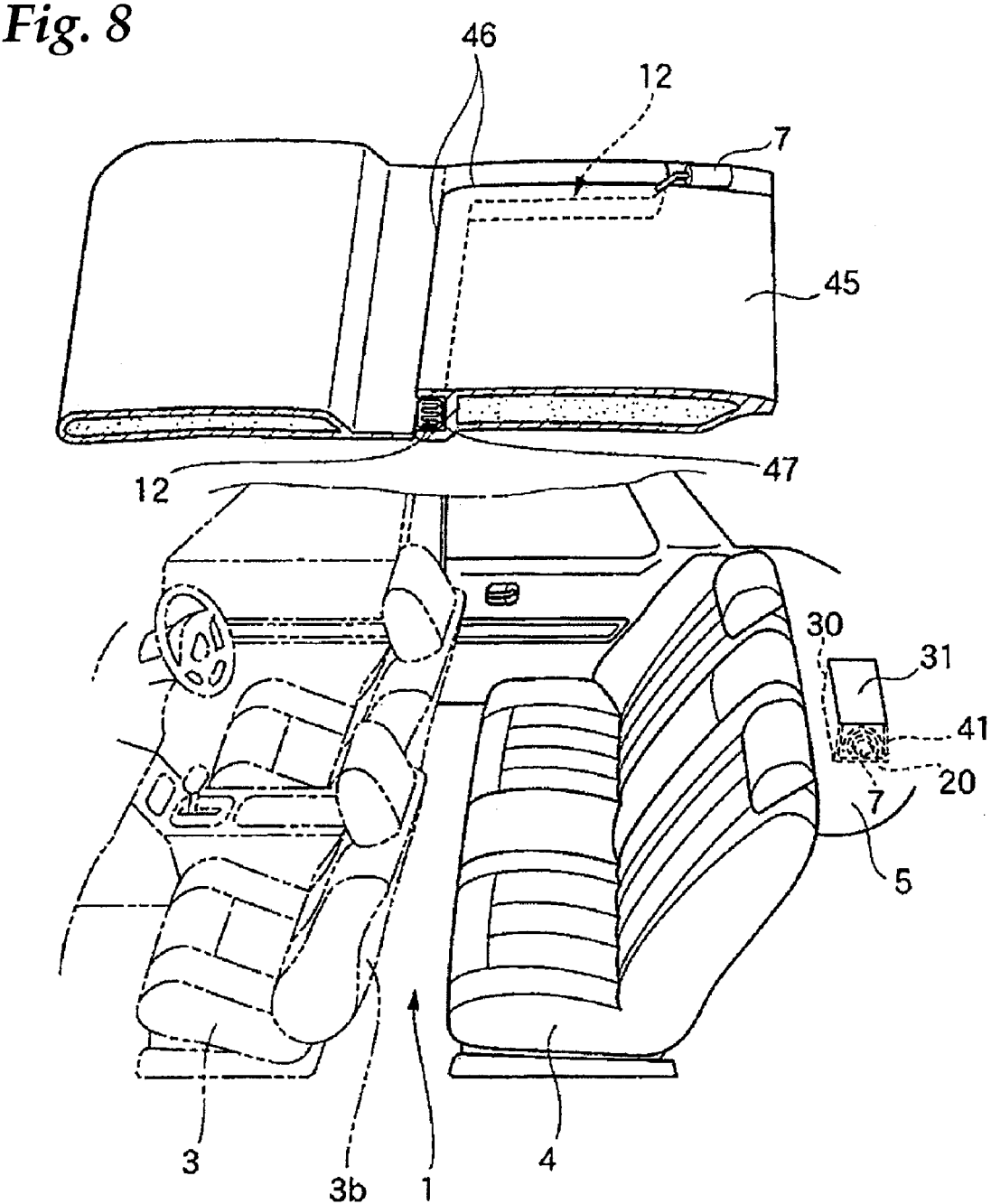
FIG. 8 is a diagram depicting the airbag, shown in FIG. 7, as housed in the vehicle.

FIG. 7 is a diagram depicting an embodiment of an occupant restraint system 10 deployed in the rear seats which is designed to protect from either a frontal collision or a side collision. FIG. 8 is a diagram showing the airbag as housed in the vehicle. As shown in FIG. 8, in this Embodiment 2, a rear seat surrounding airbag device (hereinafter referred to as surrounding airbag 12), which is housed in a recess 47 in a ceiling liner 45 and deploys in a substantially C-shaped form so as to surround the rear seats (FIG. 7), as well as a rear seat center airbag device (hereinafter referred to as center airbag 20) restrains occupants on the rear seats in the event of a collision.

The structure of the surrounding airbag 12 is briefly described below. FIG. 7 shows the surrounding airbag 12 in an inflated state which deploys so as to surround the front side and the vehicle window sides of the rear seats 4. As shown in FIG. 8, the surrounding airbag 12 is normally accordion-folded in a substantially square U-shaped form in such a manner that its rear side, as viewed horizontally, opens to the passenger compartment, and is housed in the recess 47 which is formed in part of the circumference of the ceiling liner 45 made of a resin molding and includes slits 46 provided on the surface of the ceiling liner 45.

As shown in FIG. 7, the surrounding airbag 12 projects to the passenger compartment from the inside of the ceiling liner through the score groove at the time of the inflation and deployment. The surrounding airbag is provided with cells 12a, each vertically inflating to a size of about 100 mm thick, 100 to 150 mm wide, and 400 to 500 mm high. In the surrounding airbag 12, cells 12a communicate with each other in its inner side so as to form a wall-like form in whole. Such a wall-like form consists of a front wall cushion 12A of a rectangular, wall-like shape, as viewed from the rear seat 4, both ends of the front wall cushion 12A, and a side wall cushion 12B having a substantial L shape.

A shape retaining sheet 13 is provided at the inside of a corner 12C between the front wall cushion 12A and the side wall cushion 12B. In this embodiment, the shape retaining sheet 13 is a fabric member formed by sewing a foundation cloth into the cells 12a of the surrounding airbag 12 along their seams. The shape retaining sheet 13 plays a role in retaining the shape of the corner 12C between the front wall cushion 12A and the side wall cushion 12B when the airbag deploys as well as in reducing the distance which an occupant (not illustrated) travels toward the corner 12C in a collision. When an occupant comes into contact with the shape retaining sheet 13, the shape retaining sheet 13, made of fabric, receives the occupant in association with the deforming cushions, thereby providing collision energy absorption (EA) effect associated with an impact of an occupant. The center airbag 20 has the same structure as that in Embodiment 1.

The operation of an occupant restraint system 10 having the structure according to Embodiment 1 and Embodiment 2 above will now be described below with reference to FIGS. 9 through 11.

Figure 9A:
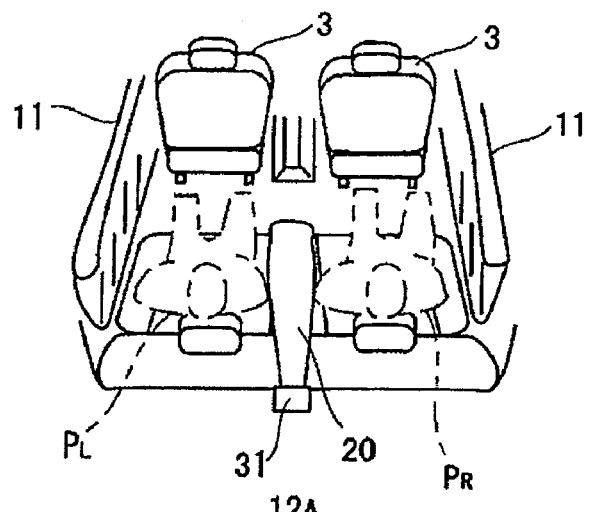
FIGS. 9(a) to 9(c) are diagrams showing the relationship between occupants and the airbags, as inflated, of an occupant restraint system.
Figure 9B:
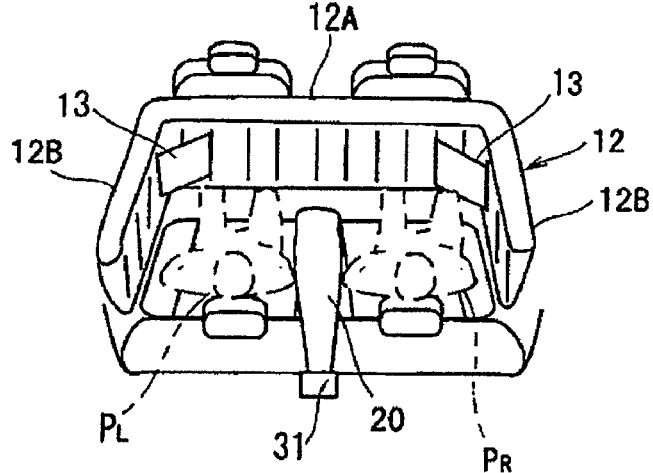
Figure 9C:
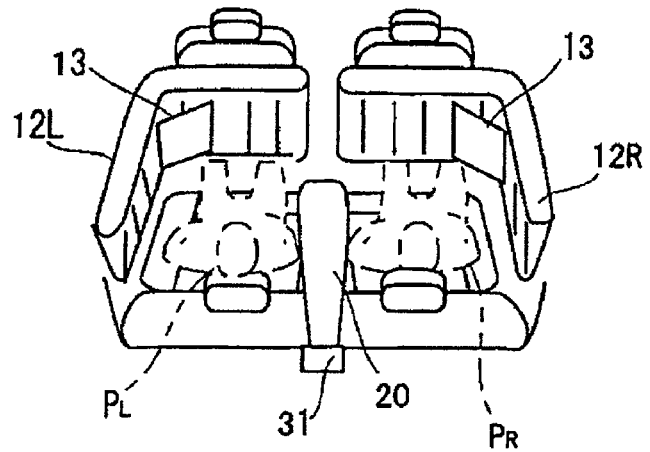

In both of Embodiment 1 and Embodiment 2, the vehicle is provided with various types of sensors for sensing a frontal collision, a side collision, an oblique collision, and a rollover. A frontal collision detecting sensor 8 and a side collision detecting sensor 9R, 9L are illustrated as examples of these sensors in FIG. 1. A status signal generated by any one of the sensors 8, 9R, or 9L according to a collision is usually sent to the electronic control unit (ECU) of a controller 6 located in front of the driver's seat. Generally, the status signal from a collision detecting section such as sensors 8, 9R, and 9L goes through parallel processing in the ECU, which predicts a possible collision occurrence or identifies a collision pattern, thereby inflating and deploying an airbag most suitable for occupant restraint. FIGS. 9(a) to 9(c) depict all of the airbags (side curtain airbag device 11, surrounding airbag device 12, 12R, 12L, and rear seat center airbag device 20) as inflated in the vehicle. As an example of the modified EMBODIMENT 2, FIG. 9(c) shows a type of the surrounding airbag in which a surrounding airbag 12R and a surrounding airbag 12L deploy independently of each other. According to such a modification, only the surrounding airbag 12 (12R or 12L) for the seating position of an occupant P can be deployed. FIG. 9(c) shows that both of the surrounding airbags 12R, 12L are in an inflated state since occupants $P_R$, $P_L$ are seated on both of the rear seats.

The inflation and the occupant restraint pattern of the airbags 11, 12 (12R or 12L), or 20 are described below with reference to FIGS. 10(a) and 10(b) (see FIG. 1 for the control system configuration).

Figure 10A:
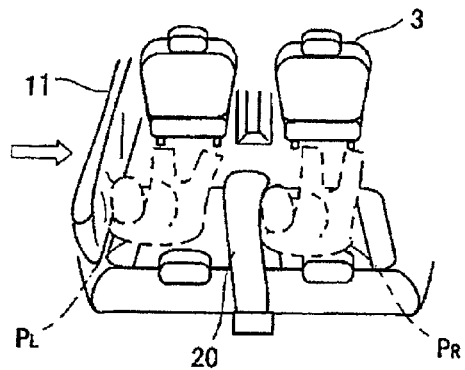
FIGS. 10(a) and 10(b) are diagrams showing how occupants are restrained by the airbags in a collision.

FIG. 10(a) is a schematic diagram, as viewed from the rear of the passenger compartment 1, showing that, in the airbag configuration shown in FIG. 9(a), the curtain airbag 11 and the center airbag 20 inflate when the side collision sensor 9L detects a left side collision. As shown in FIG. 10(a), if an impact is exerted on the side of a vehicle in the direction indicated by an arrow, an occupant $P_L$ on the left seat is restrained by the curtain airbag 11, while an occupant $P_R$ on the right seat is restrained by the center airbag 20.

Figure 10B:
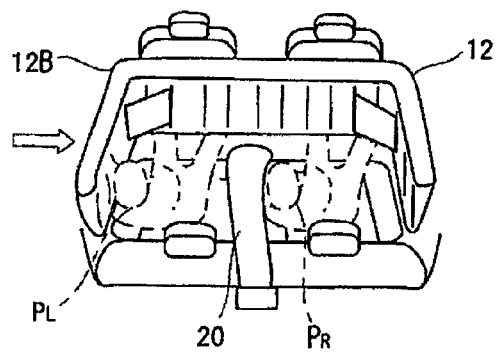

FIG. 10(b) is a schematic diagram, as viewed from the rear of the passenger compartment 1, showing that, in the airbag configuration shown in FIG. 9(b), the surrounding airbag 12 and the center airbag 20 inflate when the side collision sensor 9L (see FIG. 1) detects a left side collision. As shown in FIG. 10(b), if an impact is exerted on the side of a vehicle in the direction indicated by an arrow, an occupant $P_L$ on the left seat is restrained by the left side wall cushion 12B of the surrounding airbag 12, while an occupant $P_R$ on the right seat is restrained by the center airbag 20. As just described above, the center airbag 20 can restrain an occupant on the other side of an impacted seat at a collision.

Figure 11A:
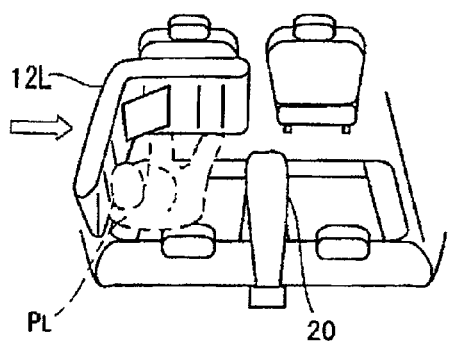
FIGS. 11(a) and 11(b) are diagrams showing how occupants are restrained by the airbags in a collision.

FIG. 11(a) shows that only the left side surrounding airbag 12L for the rear left seat deploys in a left side collision when a seat weight sensor (not illustrated) on the rear seat detects that an occupant $P_L$ is seated on the rear left seat only.

Figure 11B:
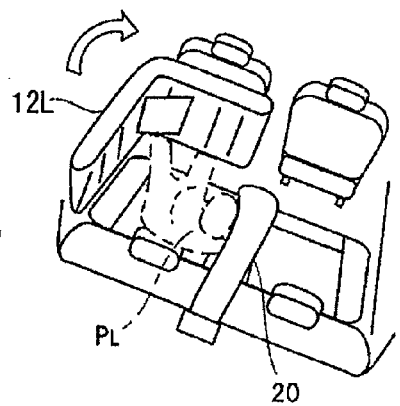

As shown in FIG. 11(a), in a left side collision, an occupant PL on the left seat is restrained by the side wall cushion 12B of the left side surrounding airbag 12L. In addition, in a rollover as shown in FIG. 11(b), an occupant $P_L$ falls onto the center airbag 20 from the position as shown in FIG. 11(a), but is restrained by the center airbag 20.

The present invention has been described above with reference to, but not limited to, the foregoing preferred embodiments. In addition to the preferred embodiments above, the following structure is conceivable.

Center Airbag Having a Sandwich Structure

Figure 12A:
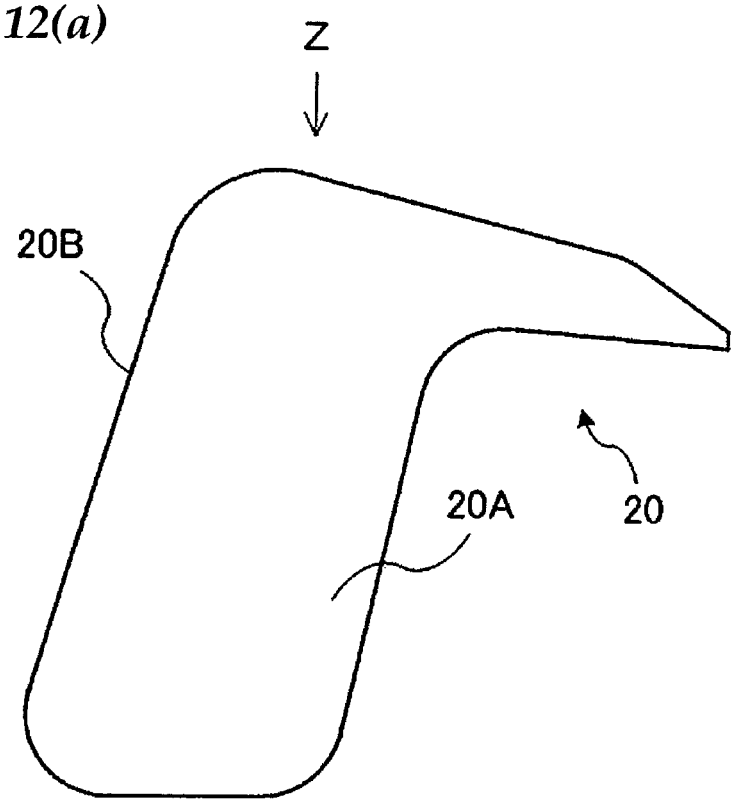
FIGS. 12(a) and 12(b) are a side view and an end view taken from "Z", respectively, showing an exemplary structure of modifications to the center airbag device in FIG. 3.
Figure 12B:
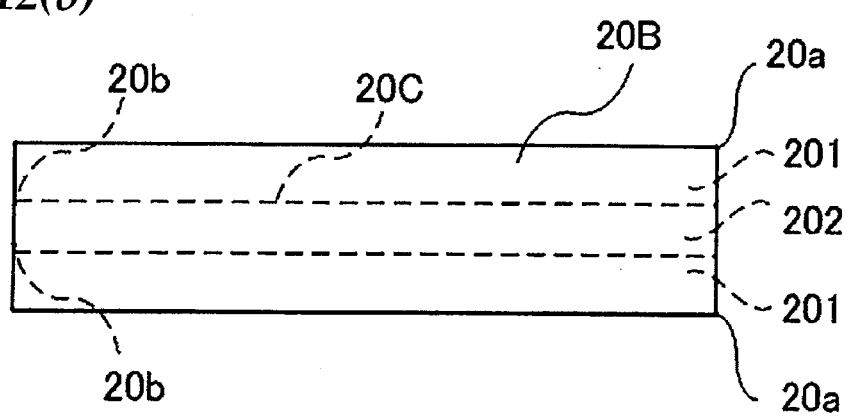

FIGS. 12(a) and 12(b) show an example of modifications made to the center airbag shown in FIG. 3. FIG. 12(b) is an end view taken from "Z" in FIG. 12(a). The modified center airbag 20 is similar to the external airbag 21 shown in FIG. 3 in that the external surface consists of a side panel 20A and a belt-like panel 20B.

As shown in FIG. 12(b), the modified center airbag 20 has the same structure as that shown in FIG. 3 except that the modified airbag 20 has two inner panels 20C formed thereinside. The inner panel 20C may be a foundation cloth made of the same material as the side panel 20A and the belt-like panel 20B. The two inner panels 20C are provided so as to be parallel to the side panel 20A, and its peripheral edge is sewed into the belt-like panel 20B.

A seam 20b between the inner panel 20C and the belt-like panel 20B is fitted along the entirety thereof with a sealing tape (not illustrated), thereby keeping the seam 20b air-tight. In contrast, a seam 20a between the side panel 20A and the belt-like panel 20B is not fitted with a sealing tape, like the center airbag shown in FIG. 3.

Two first chambers 201 formed at the rear occupant sides (side panel 20A sides) and an air-tight, second chamber 202 formed between the first chambers 201 constitute a center airbag 20 having a sandwich structure. In other words, the first chamber 201 corresponds to the external airbag 21 in FIG. 3, while the second chamber 202 corresponds to the internal-cylindrical airbag 22. With this arrangement, despite its simplified structure the modified center airbag 20 provides a similar rear occupant restraint effect to the center airbag shown in FIG. 3 in the event of a side collision.

Another Example of Modifications

A concave portion, as shown in FIGS. 4(a) and 4(b) and FIGS. 5(a) and 5(b), may be provided on the center airbag 20 shown in FIG. 3 to form a thorax restraint region 23. For example, the side panel 20A of the external airbag 21 may be sewed into the side panel of the internal-cylindrical airbag 22, face-to-face with the side panel 20A.

Although the seam of an airbag is used as an opening through which a gas in the external airbag 21 is discharged, a vent hole, for example, may be provided in the external airbag 21 instead of the opening.

Although airbags 26 are bundled with one belt-like foundation cloth 27 in the center airbag as shown in FIG. 5, more than one belt-like foundation cloth can be used. Also, the belt-like foundation cloth 27 may be sewed into the concave portion 26a so as to form a thorax restraint region 23.

Although examples of combinations of side airbags 11, 12, 12R, and 12R with a center airbag 20 are shown in FIGS. 9(a) to 9(c), combinations other than these can constitute a occupant restraint system 10. For example, a curtain airbag 11 can be separately provided in each of the front and the rear seats, although the same curtain airbag 20 is used throughout the front and the rear seats as shown in FIG. 1. Also, an airbag is provided on the rear face (in front of a rear occupant) of a front seat 3, and this airbag may be combined with the curtain airbag 11 or the center airbag 20.

Although one center airbag 20 is provided between the left and the right occupants in the above-described embodiment, more than one center airbag 20 may be provided in a large-sized vehicle.

The present invention described herein has industrial applicability to, for example, passenger cars.

What is claimed is:

1. An occupant restraint system for a vehicle having a rear seat including a rear seat back and a seating surface, and a rear tray extending rearwardly from an upper portion of the seat back, the occupant restraint system comprising:
   a side airbag device having a first airbag for, in a side collision, receiving gas supply from a first inflator and inflating to deploy such that the first airbag covers a side internal surface of a passenger compartment; and
   a rear seat airbag device having a second airbag that when inflated has an upside-down L-shaped configuration in profile with the second airbag being housed in a support section formed in the rear tray, the support section being covered with a lid, such that in the side collision, the second airbag receives gas supply from a second inflator, presses to open the lid, projects out of the support section, and inflates so that an upper short leg portion of the L-shaped second airbag inflates to project forwardly from the rear tray from behind the rear seat back and is sized to project forwardly beyond the rear seat back, and so that a long leg portion of the second airbag is inflated downwardly from the upper short leg portion toward the seating surface.

2. The occupant restraint system according to claim 1, wherein the support section comprises a first recessed portion formed in the rear tray.

3. The occupant restraint system according to claim 1, wherein the support section is formed in the rear tray such that the second airbag inflates to deploy in a breadthwise direction of a vehicle so as to be able to restrain a rear seat occupant from an internal side of the vehicle.

4. The occupant restraint system according to claim 1, wherein the second airbag has height above the seating surfaces of the rear seats so that a head of the rear seat occupant may be restrained at the time of inflation and deployment thereof.

5. An occupant restraint system, comprising:
   a side airbag device having a first airbag for, in a side collision, receiving gas supply from a first inflator and inflating to deploy such that the first airbag covers a side internal surface of a passenger compartment; and
   a rear seat airbag device having a second airbag that is housed in a support section formed in a rear tray, the support section being covered with a lid, in the side collision, receives gas supply from a second inflator, presses to open the lid, projects out of the support section, and inflates to develop toward seating surfaces of rear seats,
   wherein the support section is formed in the rear tray such that the second airbag inflates to deploy in a breadthwise direction of a vehicle so as to be able to restrain a rear seat occupant from an internal side of the vehicle, and the second airbag comprises an external airbag that, at the time of inflation and deployment, is formed in a L-shape and has an opening through which the gas is discharged by pressing force exerted by the rear seat occupant, and an air tight internal cylindrical airbag being formed in an L-shape inside the external airbag at the time of inflation and deployment thereof.

6. An occupant restraint system, comprising:
   a side airbag device having a first airbag for, in a side collision, receiving gas supply from a first inflator and inflating to deploy such that the first airbag covers a side internal surface of a passenger compartment; and
   a rear seat airbag device having a second airbag that is housed in a support section formed in a rear tray, the support section being covered with a lid, in the side collision, receives gas supply from a second inflator, presses to open the lid, projects out of the support section and inflates to develop toward seating surfaces of rear seats,
   wherein the support section is formed in the rear tray such that the second airbag inflates to deploy in a breadthwise direction of a vehicle so as to be able to restrain a rear seat occupant from an internal side of the vehicle, and the second airbag comprises a first and second bags, each being formed in an L-shape, having a second recessed portion formed on a side surface being in contact with the rear seat occupant at the time of inflation and deployment thereof, and being joined to each other so as to be symmetrical relative to a joining surface between the first and second bags.

7. The occupant restraint system according to claim 6, wherein the first and second airbags are joined to each other by being bundled with a belt-like member.

8. An occupant restraint system, comprising:
a side airbag device having a first airbag for, in a side collision, receiving gas supply from a first inflator and inflating to deploy such that the first airbag covers a side internal surface of a passenger compartment; and
a rear seat airbag device having a second airbag that is housed in a support section formed in a rear tray, the support section being covered with a lid, in the side collision, receives gas supply from a second inflator, presses to open the lid, projects out of the support section, and inflates to develop toward seating surfaces of rear seats,
wherein the support section is formed in the rear tray such that the second airbag inflates to deploy in a breadthwise direction of a vehicle so as to be able to restrain a rear seat occupant from an internal side of the vehicle, and the second airbag comprises two first chambers each being formed in an L-shape at the time of inflation and deployment thereof, and having an opening through which the gas is discharged by pressing force exerted by the rear seat occupant at the time of restraint, and an airtight second chamber provided between the two first chambers.

9. The occupant restraint system according to claim 1, wherein the side airbag device comprises the first airbag folded and housed in an upper side portion of the passenger compartment so as to deploy in a curtain-like form along the inner side of the passenger compartment.

10. An occupant restraint system, comprising:
a side airbag device having a first airbag for, in a side collision, receiving gas supply from a first inflator and inflating to deploy such that the first airbag covers a side internal surface of a passenger compartment; and
a rear seat airbag device having a second airbag that is housed in a support section formed in a rear tray, the support section being covered with a lid, in the side collision, receives gas supply from a second inflator, presses to open the lid, projects out of the support section, and inflates to develop toward seating surfaces of rear seats,
wherein the side airbag device comprises the first airbag folded and housed in a substantially square U-shaped third recessed portion formed flat in a part of a ceiling liner member directing toward and opened to a rear side of the vehicle so as to deploy such that a wall-like unit combining a front wall and both of side walls surrounds the rear seats.

11. The occupant restraint system according to claim 1, wherein the rear seat airbag device comprises the second airbag folded and housed in a casing together with the second inflator, the casing having an upper opening covered with the lid and being secured to the support section.

12. An occupant restraint system for a vehicle having a rear seat including a seat back and a seating surface, the occupant restraint system comprising:
an airbag configured and arranged to be deployed along one side of the vehicle rear seat;
an airbag support behind the rear seat in which the airbag is stored prior to deployment thereof;
an inflator for supplying inflation gas to the airbag for inflation thereof;
an upper portion of the airbag configured to be inflated forwardly from the airbag support when the airbag is deployed;
a main passenger restraint portion of the airbag configured to be inflated downwardly from the upper portion toward the rear seating surface; and
an intermediate region of the main passenger restraint portion structurally delineated from upper, lower, forward and rearward regions of the main passenger restraint portion such that with the airbag inflated, the intermediate region is spaced forwardly from the seat back and higher than the seating surface of the vehicle rear seat.

13. The occupant restraint system of claim 12 wherein the intermediate region has a closed loop perimeter extending thereabout delineating the intermediate region from adjacent upper, lower, forward and rearward regions of the main passenger restraint portion.

* * * * *